United States Patent [19]
Ainsworth

[11] 3,830,058
[45] Aug. 20, 1974

[54] FAN ENGINE MOUNTING
[75] Inventor: Richard Ainsworth, Huntington, Conn.
[73] Assignee: Avco Corporation, Stratford, Conn.
[22] Filed: Feb. 26, 1973
[21] Appl. No.: 335,750

[52] U.S. Cl................ 60/226 R, 60/39.31, 244/54, 415/79, 415/219 R
[51] Int. Cl............................. F02c 3/06, F02c 7/20
[58] Field of Search.... 60/226 R, 262, 39.31, 39.32, 60/39.33; 415/79, 199 R, 219 R; 244/54

[56] References Cited
UNITED STATES PATENTS

| | | | |
|---|---|---|---|
| 2,539,960 | 1/1951 | Marchant et al. | 244/54 X |
| 3,190,591 | 6/1965 | Bligard et al. | 244/54 |
| 3,264,482 | 8/1966 | Clark et al. | 415/79 |
| 3,327,473 | 6/1967 | Smith | 60/39.31 |
| 3,390,527 | 7/1968 | Decher et al. | 60/226 |
| 3,398,535 | 8/1968 | Campbell et al. | 60/39.31 X |
| 3,494,129 | 2/1970 | Krebs et al. | 60/226 |
| 3,540,682 | 11/1970 | Dibble et al. | 60/226 X |
| 3,673,802 | 7/1972 | Krebs et al. | 60/262 X |
| 3,688,560 | 9/1972 | Broman et al. | 60/39.33 X |
| 3,750,983 | 8/1973 | Morris | 60/226 R |
| 3,792,586 | 2/1974 | Kasmarik et al. | 60/226 R |

FOREIGN PATENTS OR APPLICATIONS

| | | | |
|---|---|---|---|
| 1,503,604 | 9/1969 | Germany | 415/79 |
| 937,826 | 9/1963 | Great Britain | 415/79 |

*Primary Examiner*—William L. Freeh
*Assistant Examiner*—Robert E. Garrett
*Attorney, Agent, or Firm*—Charles M. Hogan; Gary M. Gron

[57] ABSTRACT

A cast structural fan frame assembly has a core gas turbine engine secured to its aft end and a fan assembly secured to its forward end. The structural frame has a series of four mounting pads equally spaced around its outer ring to provide a high degree of flexibility in mounting the engine in a airframe. Loads are transmitted to the mounting pads through a series of streamlined struts that are canted to minimize the bending load on the outer ring. The struts interconnect with inner ribs that help distribute the load evenly over an inner ring to which the core engine is secured. The struts are hollow to provide access to and from the core engine without disturbing the fan flow path for accessory components, such as electrical, air and oil lines.

20 Claims, 5 Drawing Figures

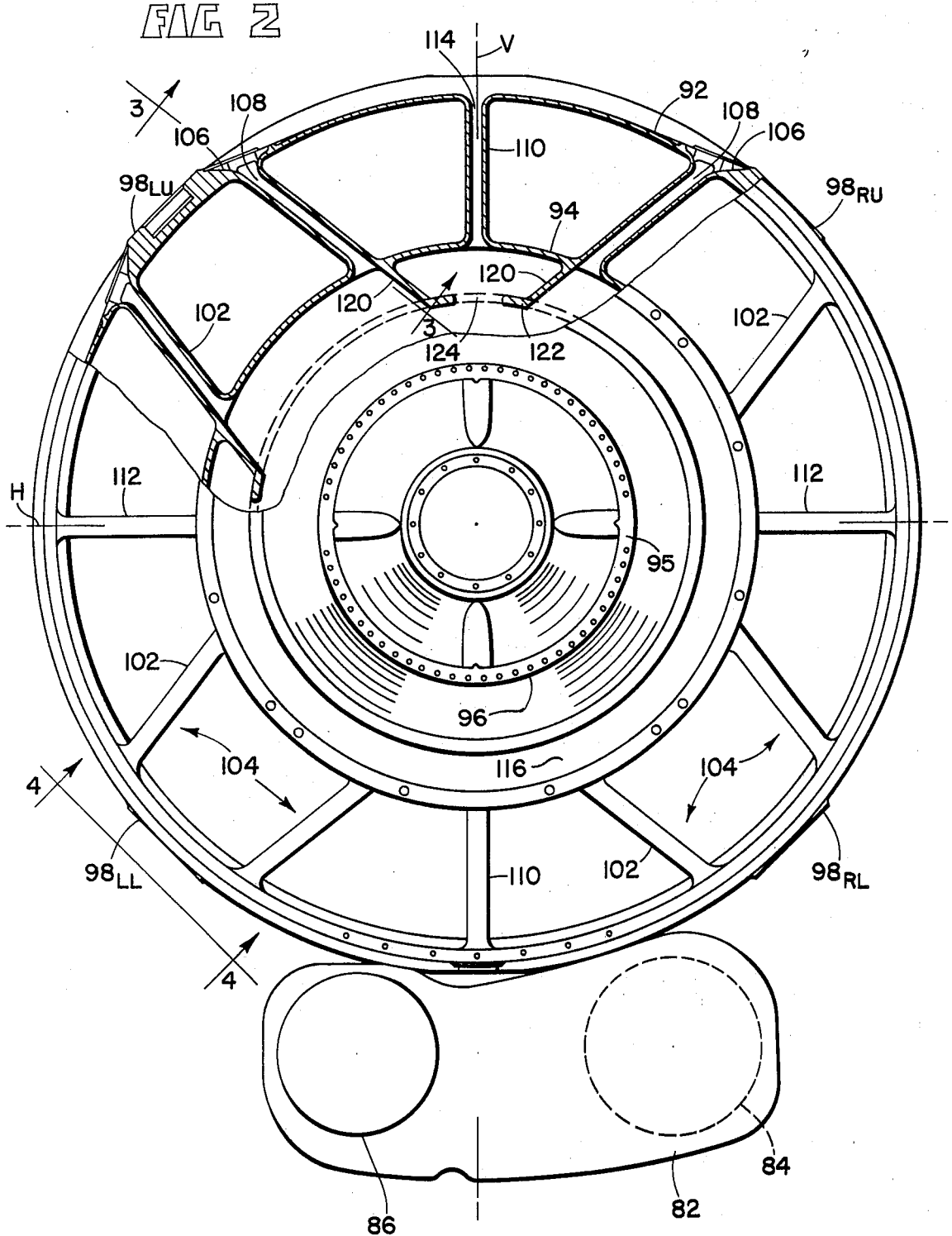

FAN ENGINE MOUNTING

The present invention relates to gas turbine engines and more particularly to a structural support arrangement for this type of engine.

The wide variety of airframes that a fan-type gas turbine engine is designed to go into necessitates many diverse arrangements for structurally supporting the engine in the aircraft. Wing-root mounted engines, pod mounted engines on the aft end of the fuselage, and pod mounted engines on the wing, each require a different arrangement to properly carry the engine loads into the airframe. This requirement for a custom installation greatly adds to the expense and complexity of a gas turbine engine.

These problems are solved by a structural support frame for a fan-type gas turbine engine that has a core engine in an annular housing. The core engine rotatably drives a fan which discharges air from an annular fan flow path to provide a propulsive thrust. The support frame comprises outer and intermediate concentric structural rings respectively forming the outer and inner bounds of a portion of the fan flow path and an inner concentric structural ring forming a forward extension of the engine housing, the engine housing being releasably secured to the inner ring. A plurality of mounting pads are integral with and positioned at spaced locations around the circumference of the outer ring. A plurality of streamlined struts extend from the outer to the intermediate ring across the fan flow path. Certain of the struts are arranged in canted pairs and have their outer ends closely adjacent opposite sides of the mounting pads to minimize the bending loads transmitted through the outer ring to the mounting pads. A means is provided to structurally interconnect the intermediate and inner ring for transmitting the loads between the inner ring and the struts.

The above and other related features of the present invention will be apparent from a reading of the following description of the disclosure found in the accompanying drawings and the novelty thereof pointed out in the appended claims.

In the drawings:

FIG. 5 is a greatly enlarged fragmentary view of FIG. 1.

Figure 1:
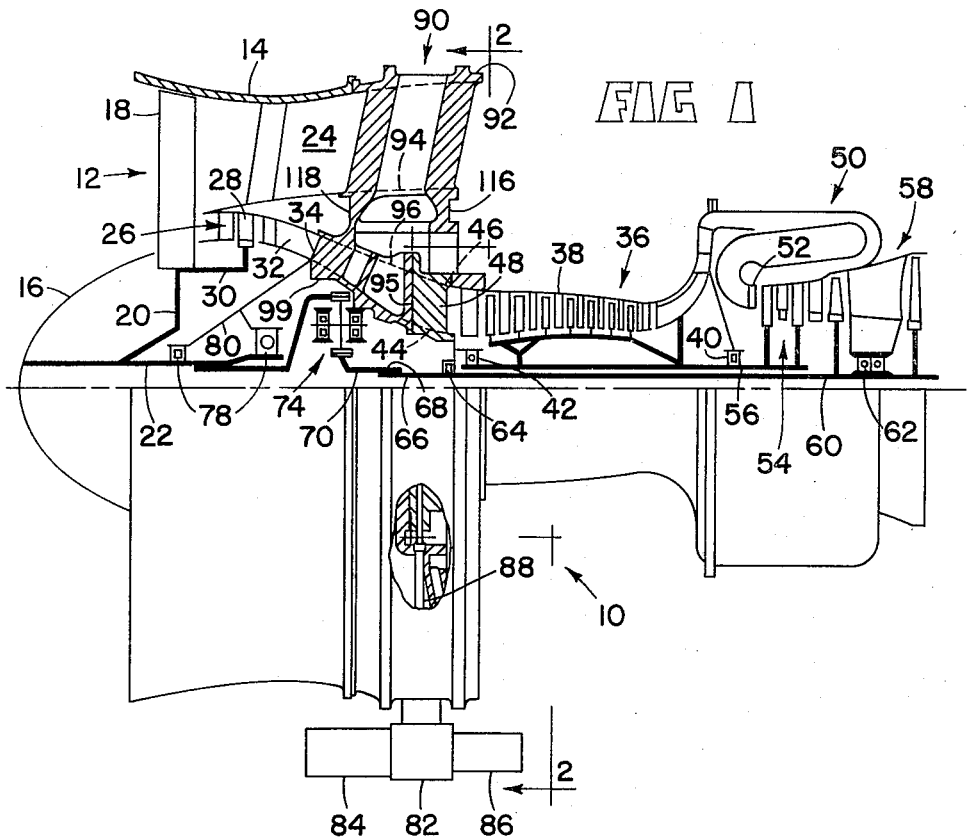
FIG. 1 is a longitudinal section view of a gas turbine engine, shown partly in simplified fashion, which incorporates a structural support frame embodying the present invention.

Referring to FIG. 1 there is shown a gas turbine engine 10 of the fan type. The engine comprises an annular inlet 12 defined by a fan shroud 14 and an inlet spinner 16. A plurality of blades 18 extending from a hub 20 are rotatably mounted on a shaft 22 to accelerate air through a fan discharge duct 24 to provide a propulsive thrust for the engine 10.

A portion of the air accelerated by the blades 18 is directed through a core engine inlet 26 and pressurized by a plurality of blades 28, also secured to hub 20 through an annular support element 30. The pressurized air flows through an annular core engine inlet passage 32 past struts 34 to a compressor rotor, referred to at 36. Compressor rotor 36 is journaled within an annular engine housing 38 by a bearing 40 at its aft end and a bearing 42 at its forward end. As pointed out later, the bearing 42 is supported by an annular ring 44 connected to an outer ring 46 through streamlined struts 48. Outer ring 46 is suitably connected to the forward face of engine housing 38.

The compressor rotor 36 pressurizes air for delivery to a combustor 50 where fuel is mixed with the pressurized air and ignited to produce a propulsive gas stream. This stream is discharged through a turbine inlet nozzle 52 and across a compressor turbine assembly 54 to drive the compressor rotor through an interconnecting shaft 56. From there the hot gas stream passes across a fan turbine assembly 58 which drives a tubular core engine output shaft 60, journaled by bearings 62 at its aft end and bearing 64 at its forward end. Bearing 64 is supported from inner ring 44. The forward end of core engine output shaft 60 has external splines 66 received within internal splines 68 of a sun gear assembly 70. As shown in FIG. 5, the shaft 60 is removably secured to the sun gear assembly 70 by a bolt 72 extending through a hole 73 in a wall 71 integral with shaft 60. Bolt 72 is threaded into an element 69 secured to the sun gear assembly 70. Bolt 72 is removed by access from the aft end of the engine through the interior of output shaft 60. Sun gear 70 drives a plurality of fixed planet gears 74 (only one of which is shown) which in turn drive a ring gear 76 secured to fan support shaft 22. Fan support shaft 22 is journaled by bearing assembly 78 suitably secured to a conical frame element 80.

Driven accessories for the engine are mounted from an accessory gear box 82 secured to the engine. Suitable accessories 84 and 86 are represented as being secured to this gear box. The gear box 82 receives a rotatable input from an accessory drive shaft 88 which is driven from the compressor rotor 36 by a suitable bevel, speed-reduction gear arrangement.

Figure 2:
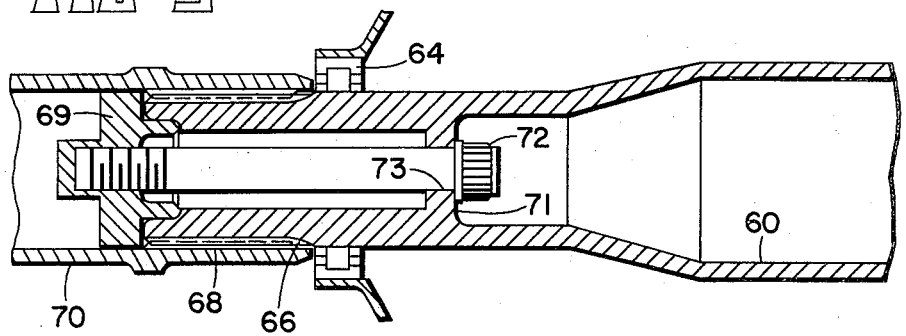
FIG. 2 is an enlarged cross-sectional view of the engine in FIG. 1, taken on line 2—2 of FIG. 1.
Figure 4:
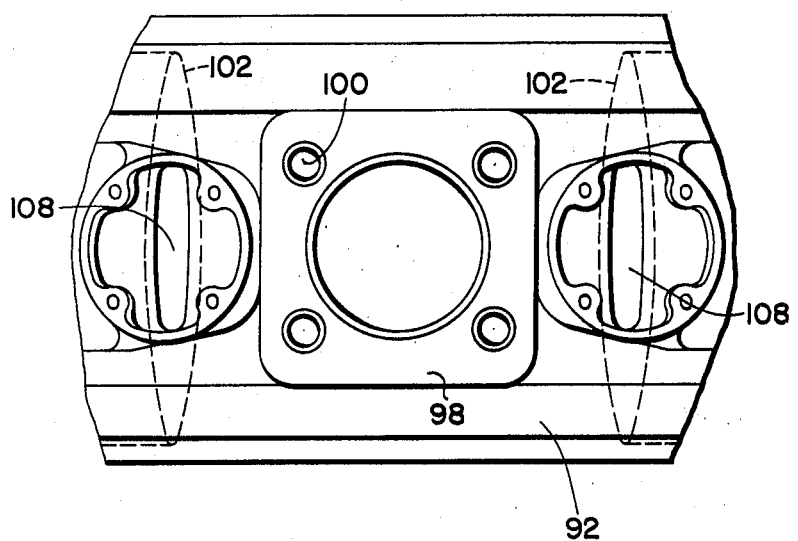
FIG. 4 is an external view of FIG. 2 taken on line 4—4 of FIG. 2.

In accordance with the present invention a structural support frame, generally indicated at 90, is provided to carry the loads from the core engine to the engine mounting arrangement. As shown particularly in FIGS. 1 and 2, the structural frame comprises an integral outer ring 92, intermediate ring 94 and inner ring 96. The outer and intermediate rings 92 and 94 form the outer and inner bounds of a portion of the fan flow path 24. The inner ring 96 is conical and forms an extension of the engine housing 38 through ring 46. Ring 96 is adapted to have the core engine releasably secured to its aft end 95 by suitable screws. A generally conical structural ring 99 is integral with the inward ends of struts 34 and has the conical support 80 releasably secured to its forward end. Integrally formed at equally spaced locations around the periphery of the outer ring 92 are four mounting pads 98. These mounting pads have suitably threaded holes 100 (see FIG. 4) that accommodate airframe mounting brackets. As shown in FIG. 2, the mounting pads 98 are positioned 90° apart from one another around the periphery of outer ring 92. The upper mounting pads $98_{ru}$, $98_{lu}$ and lower mounting pads $98_{ll}$, $98_{rl}$ positioned at approximately 45° from a vertical reference plane V passing through the center of the outer ring 92.

A plurality of struts are integral with and extend between the outer ring 92 and the intermediate ring 94.

Certain of the struts 102 are arranged in pairs 104 to transmit a major portion of the load between the mounting pads 98 to the intermediate ring 94. These pairs of struts 104 have their outer ends closely adjacent the side edges 106 of the mounting pads 98. The struts 102 extend radially inward and are canted with respect to one another so that their longitudinal axes are approximately tangent to the periphery of the aft end of the inner ring 96. These struts 102 preferably are hollow to provide through passages 108 from the outer to the intermediate rings 92–94.

Additional radial struts 110 and 112 extend vertically and horizontally between outer ring 92 and inner ring 94. These struts also have passages 114 providing access from the outer ring 92 to the inner ring 94.

Figure 3:
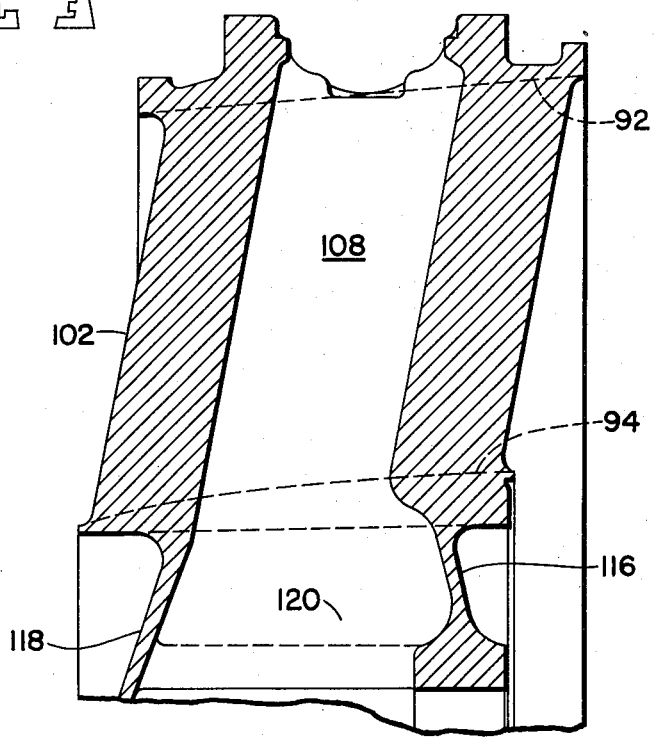
FIG. 3 is a fragmentary sectional view taken on line 3—3 of FIG. 2.

As shown in FIG. 1 and particularly in FIG. 3, ring 94 has an integral aft flange 116 extending radially inward. An integral web 118 extends between rings 94 and 96. A plurality of ribs 120 are integral with and interconnect the web 118, the intermediate ring 94 and the aft flange 116. These ribs 120 are positioned to form extensions of the side walls of the struts 102 so that they also are generally tangent to inner ring 96. Adjacent ribs 120 are interconnected through a midsection 122 which may have an opening 124 in line with passages 114 to permit radial access into the area of the core engine housing 38.

The passageway 114 in the lower radial strut 110 provides access for the accessory drive shaft 88 from the compressor rotor 36 to the accessory gear box 82. Additional access is provided through the other remaining hollow struts 110; for example, one of them may carry scavenge oil from the bearing assemblies to an oil cooler, another may carry pressurized air from the core engine to an airframe location. In addition, the remaining struts 102 can accommodate various electrical and control systems which interconnect the engine with the airframe.

The structural frame 90 permits a high degree of flexibility in mounting the engine 10 in an airframe. For example, the frame 90 through its structural interconnection between the outer ring and the core engine can be used to cantileverally support the core engine housing 38 by using three of the four mounting pads 98. This enables the entire engine to be mounted in a single plane so that the core engine housing 38 carries only the loads of the core engine and not a portion of the reaction propulsion loads which pass through the engine to the airframe. Furthermore, this arrangement permits the entire core engine to be removed without disturbing the fan assembly or mounting in the aircraft. To accomplish this the bolt 72 is removed from the aft end of the engine, the accessory drive shaft 88 removed and the intermediate ring 46 and housing 38 removed from the ring 96. This provides the highest degree of modular maintenance and provides a great economic advantage.

Additional mounting arrangements can be adopted which incorporate several of the mounting pads 98 and an additional mounting point on the core engine. For an engine mounted in a pod on the wing, mounting pads $98_{lu}$ and $98_{ru}$ are used, in addition to a single point on an aft portion of the core engine casing 38. For engines mounted in pods on either side of an aircraft fuselage, mounting pads $98_{lu}$ and $98_{ll}$ would be used in addition to a mounting point on the engine casing 38. This is for an engine mounted to the right of the aircraft centerline. For an engine mounted to the left, mounting pads $98_{ru}$ and $98_{rl}$ would be used, in addition to the single mounting point on the core engine. It should also be noted that the engine can be interchangeably mounted on either side of the aircraft centerline because the mounting pads 98 are symmetrical with respect to the vertical reference plane V.

With any of the mounting arrangements described above the propulsion forces transmitted to the airframe pass through the engine housing or fan support to the inner structural ring 96. They then pass through the web 118 and into the pairs of struts 104 to the mounting pad. The struts 102 are sufficiently tangent to the ring 96 to uniformly transmit the loads from the rim of ring 96 to the struts 102 but not canted so much that they disturb the air flow through the fan flow path 24. by making the struts 102 generally tangent to the aft end of ring 96, as seen in FIG. 2, this balance is achieved. The ribs 120 help distribute the loads from the web 118 to the struts 102 over a wider area, in addition to stiffening the intermediate ring 94 by forming a series of box sections.

The outer ends of struts 102 are closely adjacent the mounting pads 98 to minimize bending loads on the outer ring 92 but still permit access to the core area through passages 108. For a single plane cantilever mounting of the core engine, the bending loads of the core engine, due to changes in direction of the flight path, are carried substantially through the web 118. This enables the loads to be carried uniformly through the ring while eliminating any redundant support.

While the preferred embodiment of the present invention has been described, it should be apparent to those skilled in the art that the invention may be modified to other forms without departing from its spirit and scope.

Having described the invention, what is claimed as novel and desired to be secured by Letters Patent of the United States is:

1. A structural support frame for a fan-type gas turbine engine including a core engine in an annular housing, said core engine rotatably driving a fan to discharge air from an annular fan flow path to provide a propulsive thrust, said support frame comprising:

outer and intermediate concentric structural rings respectively forming the outer and inner bounds of a portion of said fan flow path, and an inner concentric structural ring forming a forward extension of said engine housing, said engine housing being releasably securable to one end of said inner ring;

a plurality of mounting pads integral with and positioned at spaced locations around the circumference of said outer ring;

a plurality of streamlined struts extending from said outer to said intermediate ring across said fan flow path, certain of said struts being arranged in pairs having their outer ends closely adjacent opposite sides of said mounting pads, whereby the bending loads on said outer ring are minimized, said pairs of struts canted with respect to one another;

structural interconnecting means extending between said intermediate and inner ring for transmitting loads between said inner ring and said struts; and said streamlined struts being canted so that they are generally tangent to said inner ring at said one end.

2. A structural support frame as in claim 1 wherein:

said inner ring is generally conical in form and has an aft end to which said engine housing is secured;
said pairs of struts are canted so that they are generally tangent to the aft end of said inner ring.

3. A structural support frame as in claim 2 wherein said structural interconnecting means comprises:
an annular web extending radially outward from said inner ring to said intermediate ring, said web being integral with said inner and intermediate rings; and ribs interconnecting said annular web and said intermediate ring, said ribs forming extensions of the walls of said struts.

4. A structural support frame as in claim 3 wherein:

said ribs of adjacent sets of struts have an integral midsection connecting one another; and
said structural support frame further comprises a flange extending radially inward from the aft end of said intermediate ring and interconnecting with the aft end of said ribs.

5. A structural support frame as in claim 1 wherein said struts are hollow and form passages from the outer to the intermediate ring, thereby providing access for accessory connections from the exterior of the engine to the core engine without disturbing the annular fan flow path.

6. A structural support frame as in claim 5 wherein at least one of said struts extends radially downward from said intermediate ring, thereby forming a passage for a radially extending accessory drive shaft.

7. A structural support frame as in claim 1 further comprising:
a generally conical ring concentric with and radially inward from said inner ring; and
a plurality of streamlined radial struts integral with said conical element and extending to said inner ring, said conical ring forming a support for said fan.

8. A structural support frame as in claim 1 having at least three mounting pads on the periphery of said outer ring, thereby permitting a single plane mounting for the engine using said structural support frame.

9. A structural support frame as in claim 1 having four equally spaced mounting pads, thereby permitting a flexible mounting arrangement for said engine.

10. A structural support frame as in claim 9 wherein said mounting pads are positioned at angles of 45° relative to a vertical reference plane passing through the rotational axis of said engine.

11. A structural support frame as in claim 10 having radial hollow struts positioned in the vertical reference plane and a horizontal reference plane of said engine.

12. A fan-type gas turbine engine comprising:
outer and intermediate concentric structural rings respectively forming the outer and inner bounds of a portion of a fan flow path for said engine and an inner concentric structural ring;
a plurality of mounting pads integral with and positioned at spaced locations around the circumference of said outer ring;
a plurality of streamlined struts extending from said outer to said intermediate ring across said fan flow path, certain of said struts being arranged in sets having their outer ends closely adjacent opposite sides of said mounting pads, whereby the bending loads on said outer ring are minimized, said sets of struts canted with respect to one another;
structural interconnecting means extending between said intermediate and inner ring for transmitting loads between said struts and said inner ring;
a core engine having an annular outer housing coaxial with said inner ring and releasably secured to its aft end; and
said streamlined struts being canted so that they are generally tangent to said inner ring at said aft end.

13. A gas turbine engine as in claim 12 further comprising:
a conical ring coaxial with and radially inward from said inner ring;
a plurality of streamlined struts extending outward from said conical ring to said inner ring; and
a fan assembly driven by said core engine and releasably securable to the forward end of said conical ring.

14. A gas turbine engine as in claim 13 wherein said struts are hollow and form through passages from the outer to the inner ring for providing accessory connections to the core engine from a point exterior to the outer ring without disturbing the fan flow path.

15. A gas turbine engine as in claim 13 wherein said structural interconnecting means comprises:
an annular integral web extending radially outward from said inner ring to said intermediate ring;
a flange element integral with the aft end of said intermediate ring and extending radially inward; and a plurality of ribs connected between said web, said intermediate ring and said aft flange, said ribs forming inner extensions of the walls of said struts.

16. A gas turbine engine as in claim 15 having four pads equally spaced around the periphery of said outer ring, thereby providing several mounting points for said engine.

17. A gas turbine engine as in claim 16 having mounting pads positioned at an angle of 45° with respect to a vertical plane passing through the axis of said engine, said gas turbine engine also having radially extending struts on the vertical reference plane and a horizontal reference plane of said engine.

18. A gas turbine engine as in claim 17 wherein at least the lower of said radial struts is hollow providing a housing for an accessory drive shaft extending from said core engine radially outward to a point exterior from said outer ring.

19. A gas turbine engine as in claim 13 wherein:
said fan assembly has an input drive shaft rotatably supported through said conical ring, said fan input drive shaft having a splined aft facing end;
said core engine has a hollow rotatable output shaft extending forward and having splines interfitting with said fan input drive shaft splines for interconnecting the fan with said engine drive shaft;
said engine further comprises means accessible from the aft end of said engine drive shaft for releasably securing said input drive shaft from said engine output shaft, thereby permitting said core engine to be removed from said intermediate ring in an aft direction without disturbing said fan assembly.

20. A gas turbine engine as in claim 19 wherein said engine further comprises:
a bearing assembly for journaling the forward end of said engine output shaft; and
an intermediate housing positioned between said intermediate ring and the forward end of said engine housing, said intermediate housing supporting said bearing assembly whereby access to said bearing assembly is provided after removal of said engine from said intermediate ring by removing said intermediate housing.

* * * * *